Feb. 8, 1938.  C. S. ASH  2,107,925
WHEEL CONSTRUCTION
Filed Aug. 12, 1935
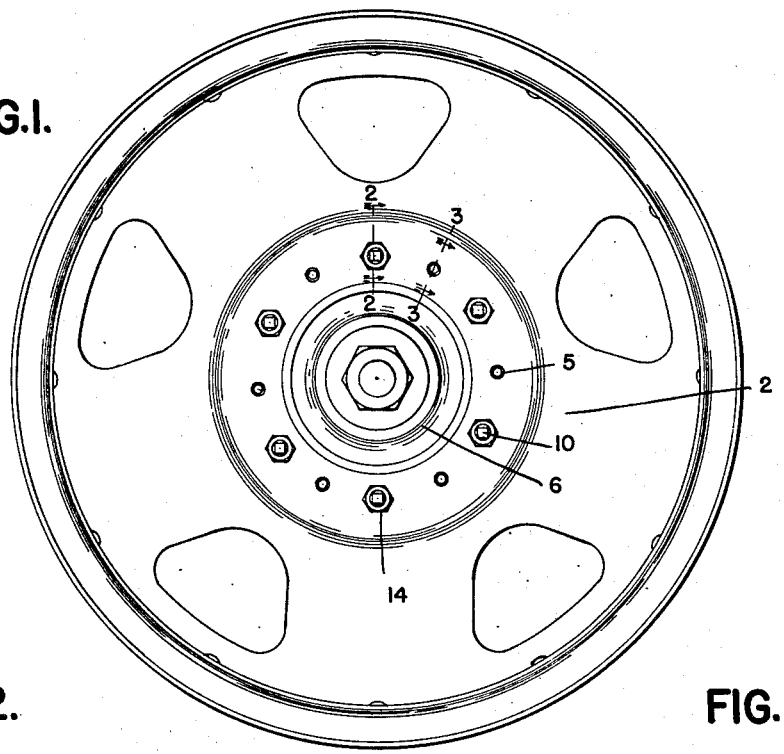
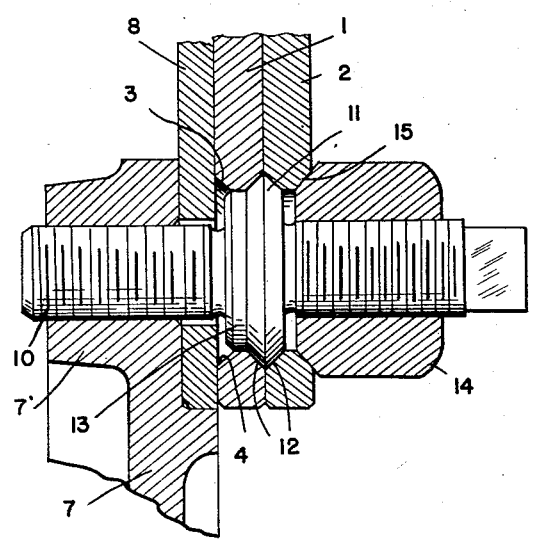 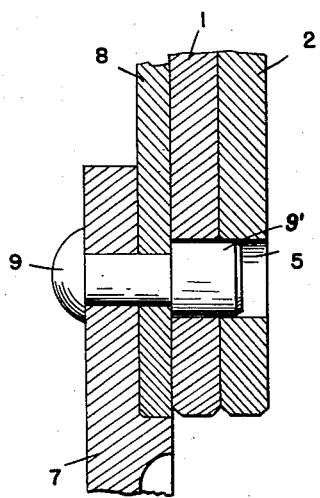
INVENTOR
CHARLES S. ASH
BY
ATTORNEYS Patented Feb. 8, 1938

2,107,925

UNITED STATES PATENT OFFICE 2,107,925

WHEEL CONSTRUCTION

Charles S. Ash, Milford, Mich., assignor to Kelsey-Hayes Wheel Company, Detroit, Mich., a corporation of Delaware Application August 12, 1935, Serial No. 35,860

4 Claims. (Cl. 301—36)

The invention relates to wheel constructions and refers more particularly to demountable wheel constructions for motor vehicles.

The invention has for one of its objects to provide an improved mounting for dual wheels so constructed that each of the wheels is individually secured to the hub. The invention has for another object to so construct the mounting devices that each comprises but two parts, one of which serves to secure the inner wheel body to the hub and position the outer wheel body and the other of which serves to secure the outer wheel body in place.

These and other objects of the invention will become apparent from the following description, taken in connection with the accompanying drawing, in which Figure 1 is an elevation of a wheel construction embodying my invention;

Figures 2 and 3 are cross sections on the lines 2—2 and 3—3 respectively of Figure 1.

As illustrated in the present instance, 1 and 2 are respectively the inner and outer wheel bodies forming the dual wheel construction. These wheel bodies are disk wheels having secured to their outer peripheries the tire carrying rims. Each wheel body is preferably formed in the same manner as the other to be interchangeable therewith and is provided in its central portion with the annular series of holes 3 therethrough having the inner and outer flared ends 4. Each wheel body is also provided with the annular series of pilot holes 5 therethrough intermediate the holes 3.

6 is the hub having the radial element 7, which, as shown, is in the nature of a flange integral with the hub. In the present instance the brake drum 8 is secured to the outer side of the flange 7 by means of the rivets 9.

For detachably securing the wheel bodies to the hub, there are the annular series of studs 10, there being one stud for each hole 3. These studs detachably threadedly engage the flange 7, the latter in the zone of the studs being provided with the bosses 7' to increase the extent of threaded engagement with the studs. Each stud has the enlargement 11 intermediate its ends and the enlargement is provided with the oppositely flared portions 12 having their faces flared toward each other. Each enlargement further has the pilot portion 13 at its inner end. The face of the inner flared portion of the enlargement is engageable with the outer flared end 4 of the associated hole 3 of the inner wheel body and the pilot portion 13 is engageable in the portion of smallest diameter of the associated hole 3 to assist in positioning the inner wheel body relative to the stud. 14 is a nut threaded upon each stud 10 and having an inner conical seating portion 15 engageable with the outer flared end 4 of the hole 3 of the outer wheel body. This nut is adapted to force the outer wheel body toward the inner wheel body and to engage the inner flared end of the hole 3 of the outer wheel body against the outer flared face of the enlargement 11.

The hub is provided with pilots 9' engageable in the pilot holes 5 in the inner wheel body, these pilots preferably having tapered outer ends. These pilots serve to initially position the inner and outer wheel bodies upon the hub.

It will thus be seen that each mounting device comprises but two parts and that when all of these mounting devices have been tightened down both wheel bodies will be effectively secured to the hub and properly centered. It will be further seen that the outer wheel body may be readily demounted without disturbing the inner wheel body.

What I claim as my invention is:

1. A vehicle wheel comprising a hub, a radial flange on said hub, an inner wheel body having an annular series of holes therethrough, each of said holes having oppositely flared ends, an annular series of studs detachably threadedly engaging said radial flange, each stud having an enlargement intermediate its ends provided with oppositely flared portions and having a portion extending axially inwardly from the flared portions, said axially extending portion adapted to extend into one of the holes in the inner wheel body and to engage the inner surface of said hole between the flared ends of the latter to position said inner wheel body, the inner flared portion of the enlargement being engageable with an outer flared end of the associated hole of said inner wheel body, an outer wheel body provided with an annular series of holes therethrough having oppositely flared ends, said inner and outer wheel bodies being interchangeable, a series of nuts threadedly engaging said studs and having conical seating portions coacting with the outer flared ends of said last mentioned holes and adapted to force said outer wheel body toward said inner wheel body and to engage the inner flared ends of said last mentioned holes against the outer flared faces of said enlargements.

2. A vehicle wheel comprising a hub member, a radially extending element on said hub member, an inner wheel body member having an annular series of holes therethrough, each of said holes having a flared outer end, an annular series of studs detachably threadedly engaging said radially extending element, each stud having an enlargement intermediate its ends provided with oppositely flared portions and having a portion extending axially inwardly from the flared portions adapted to extend into one of the holes in the inner wheel body for engagement with the inner surface of said hole to position said wheel body on the hub member, the inner flared portion of the enlargement being engageable with the outer flared end of the associated hole of said inner wheel body member, an outer wheel body member provided with an annular series of holes therethrough having inner flared ends, a series of nuts threadedly engaging said studs and having portions coacting with and adapted to force said outer wheel body member toward said inner wheel body member and to engage the inner flared ends of said last mentioned holes against the outer flared faces of said enlargements.

3. A vehicle wheel comprising a hub, a radial element on said hub, an inner wheel body having an annular series of holes therethrough, each of said holes having oppositely flared ends, said inner wheel body also having pilot holes therethrough intermediate said first mentioned holes, an annular series of studs detachably threadedly engaging said radial element, each stud having an enlargement intermediate its ends provided with oppositely flared portions and having a portion extending axially inwardly from the flared portions adapted to extend into one of the holes in the inner wheel body and to engage the inner surface of the hole between the flared ends of the latter to position the inner wheel body on the hub, the inner flared portion of the enlargement being engageable with an outer flared end of the associated hole of said inner wheel body, pilot members on said radial element engageable in said pilot holes, said pilot members having tapered outer ends, an outer wheel body provided with an annular series of holes therethrough having oppositely flared ends, a series of nuts threadedly engaging said studs and having conical seating portions coacting with the outer flared ends of said last mentioned holes and adapted to force said outer wheel body toward said inner wheel body and to engage the inner flared ends of said last mentioned holes against the outer flared faces of said enlargements.

4. A vehicle wheel comprising a hub member, a radially extending element on said hub member, an inner wheel body member having an annular series of holes therethrough, each of said holes having a flared outer end and having an intermediate portion extending axially of the hub, an annular series of studs detachably threadedly engaging the radially extending element, each stud having an enlargement intermediate its ends provided with oppositely flared portions and with a cylindrical portion extending inwardly from the flared portion at the inner side of the enlargement for engagement with the annular intermediate portions of the holes in the inner wheel body member to position the latter relative to the hub, one of the flared portions on the enlargement being engageable with the outer flared end of the associated hole of said inner wheel body member, an outer wheel body member provided with an annular series of holes therethrough having inner flared ends, a series of nuts threadedly engaging said studs and having portions co-acting with and adapted to force said outer wheel body member toward said inner wheel body member and to engage the inner flared ends of said last named holes against the outer flared faces of said enlargements.

CHARLES S. ASH.